United States Patent
Brown et al.

[15] 3,655,122
[45] Apr. 11, 1972

[54] PIPE LINE CLEANER AND SEALER

[72] Inventors: George A. Brown, P.O. Box 777, Casselberry, Fla. 32707; Francis Michael Hinds, 2411 Murphree Road, S.E., Decatur, Ala. 35601

[22] Filed: Oct. 20, 1970

[21] Appl. No.: 82,453

[52] U.S. Cl. ..........................239/226, 118/254, 134/167 C, 239/548
[51] Int. Cl. ...........................................................B05b 3/00
[58] Field of Search..................239/225, 226, 231, 246, 247, 239/548, 380, DIG. 380; 118/55, 214, 215, 254, 317; 134/167 C

[56] References Cited

UNITED STATES PATENTS

| | | | |
|---|---|---|---|
| 2,017,042 | 10/1935 | Dougherty | 134/167 C |
| 2,102,738 | 12/1937 | Perkins | 118/306 |
| 2,191,728 | 2/1940 | Purcell et al. | 118/215 X |
| 2,575,353 | 11/1951 | MacEvoy | 239/225 X |
| 2,839,026 | 6/1958 | Matheny | 118/306 |
| 2,897,779 | 8/1959 | Perkins | 118/306 |
| 3,269,421 | 8/1966 | Telford et al. | 118/254 X |

FOREIGN PATENTS OR APPLICATIONS

| | | | |
|---|---|---|---|
| 28,415 | 1/1907 | Austria | 239/548 |

Primary Examiner—M. Henson Wood, Jr.
Assistant Examiner—Edwin D. Grant
Attorney—Mason, Mason & Albright

[57] ABSTRACT

A device that can be moved through a pipe to treat its interior surfaces with a washing or sealing fluid composition including a container with fluid under pressure and a conduit leading from the container to a rotary nozzle. The conduit terminates in a head that is fixed to the conduit and housed within the nozzle. The nozzle and head are spaced from one another and have one or more passages and ducts respectively, each of which extends laterally relative to the conduit. The passage in the head can be curved so that a turbine structure is formed and exiting fluid creates a force to assist in rotating the nozzle. The nozzle can also be rotated by a motor that is mounted on the conduit and in direct drive with the nozzle. Various rotatable nozzles can be interchanged with one another so that the interior of a pipe can be air cleaned, coated and/or wiped with a wiper blade or otherwise treated with a fluid material. Also, a probe attachment can be placed in communication with a duct of the nozzle to extend a feeler element under pressure and thus assist in detecting plugs and holes in the pipe. A TV camera is normally attached at the front end of the nozzle for viewing the action of the nozzle and/or probe.

10 Claims, 13 Drawing Figures

Patented April 11, 1972

INVENTORS
GEORGE A. BROWN
FRANCIS MICHAEL HINDS

BY Mason, Mason & Albright
ATTORNEYS

INVENTORS
GEORGE A. BROWN
FRANCIS MICHAEL HINDS

BY *Mason, Mason & Albright*
ATTORNEYS

Patented April 11, 1972 3,655,122

INVENTORS
GEORGE A. BROWN
FRANCIS MICHAEL HINDS

BY *Mason, Mason & Albright*
ATTORNEYS

PIPE LINE CLEANER AND SEALER

Figure 2:
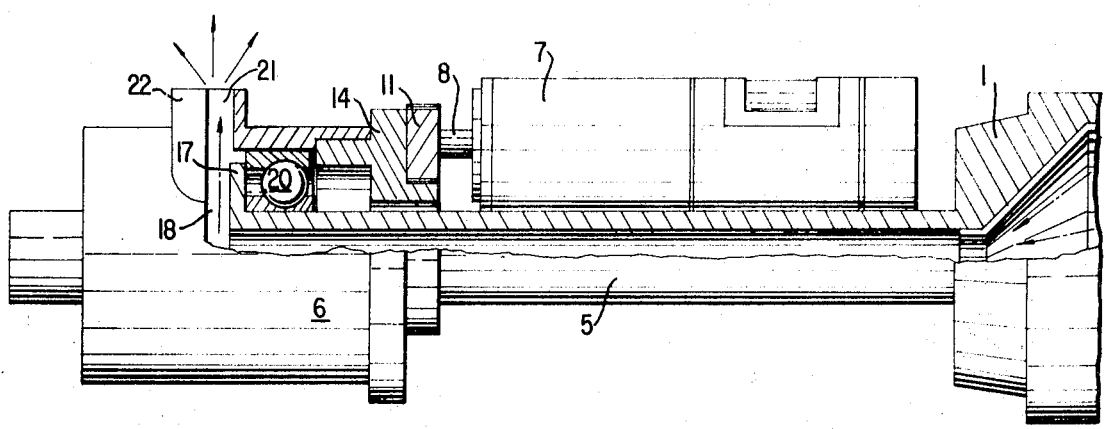
FIG. 2 is a section view of the conduit leading from the inside of the container to the nozzle.
Figure 3A:
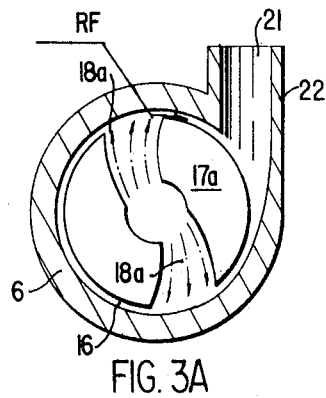
Figure 3B:
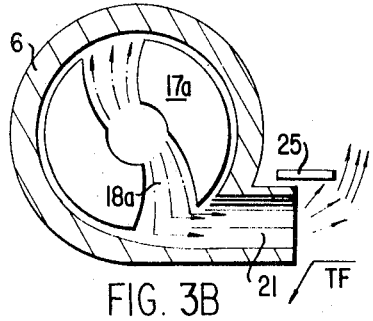
Figure 3C:
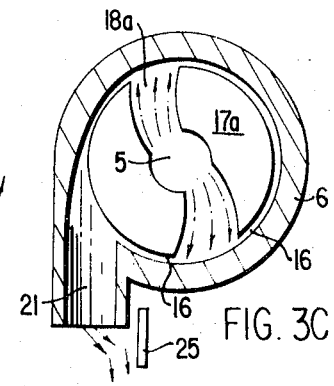

FIG. 3A, 3B, and 3C is a section view of the FIG. 2 nozzle showing the turbine action caused by fluid leaving the conduit and nozzle under pressure.

Figure 4:
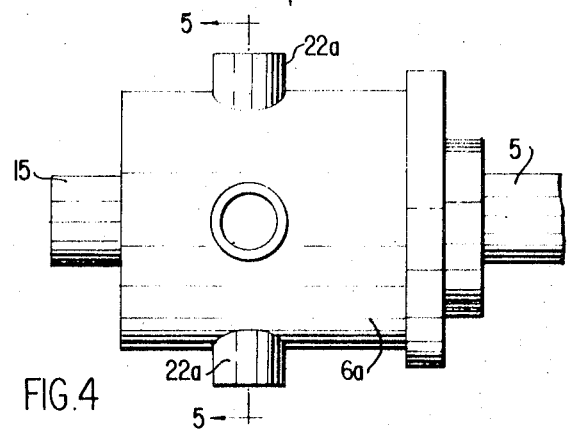

FIG. 4 is a side elevation of a modified nozzle having a plurality of tubes and ducts.

Figure 5:
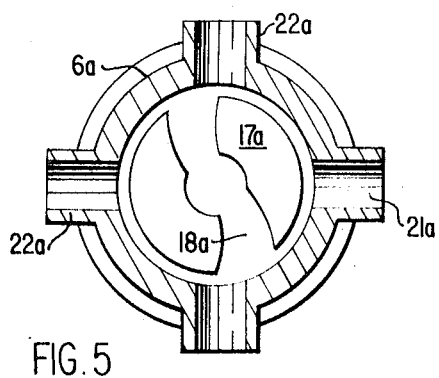

FIG. 5 is a section view of the FIG. 4 nozzle taken alone 5 — 5.

Figure 6:
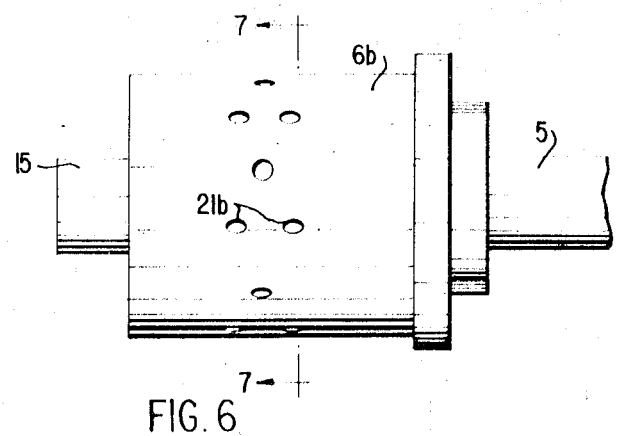

FIG. 6 is a side elevation of a further embodiment of a nozzle.

Figure 7:
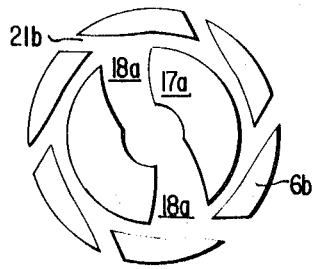

FIG. 7 is a section view of the FIG. 6 nozzle taken along 7 — 7.

Figure 8:
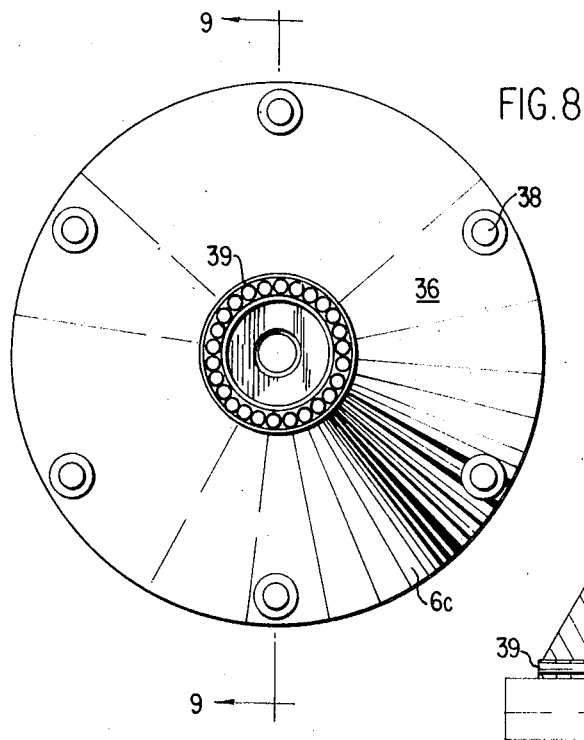

FIG. 8 is a front elevation of still another nozzle.

Figure 9:
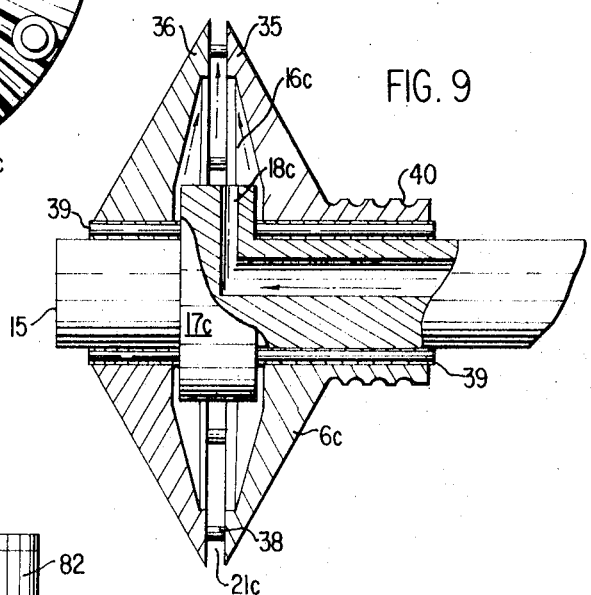

FIG. 9 is a section view along 9 — 9 of the FIG. 8 nozzle.

Figure 10:
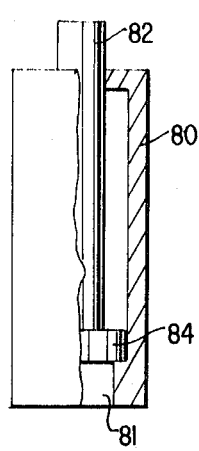

FIG. 10 is a section view of a probe in closed position, and

Figure 11:
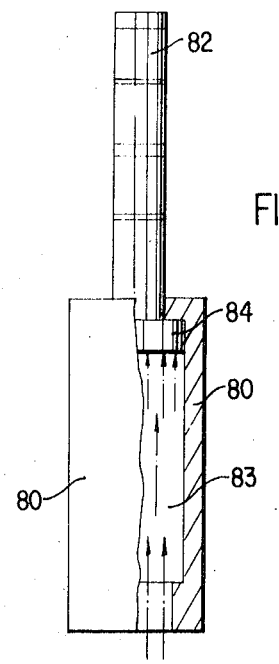

FIG. 11 is a section view of the probe in extended position.

Figure 1:
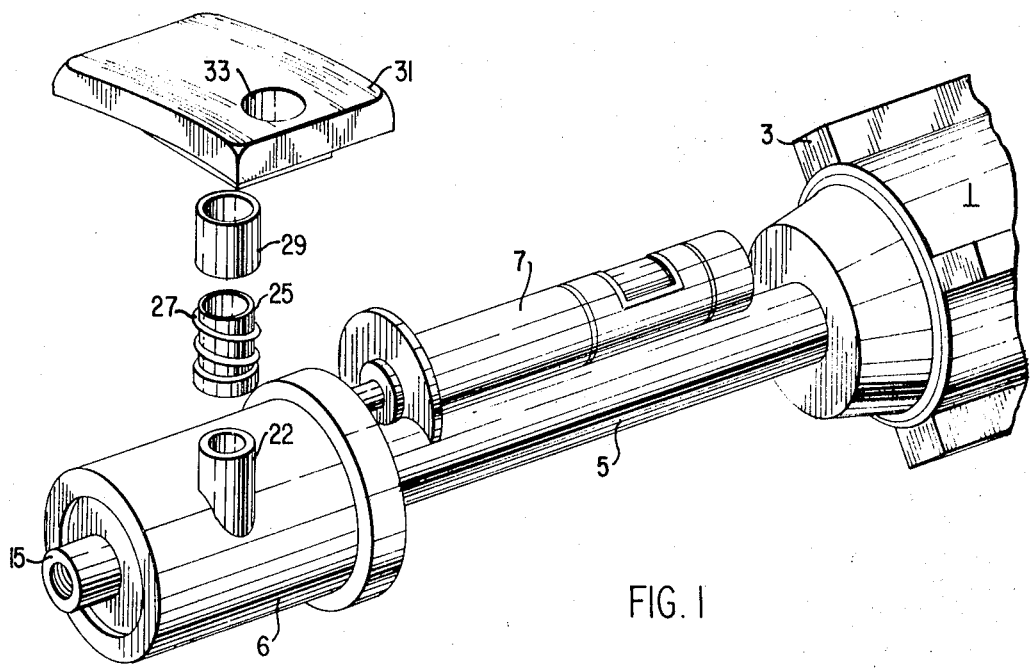
FIG. 1 is fragmented elevation view of the container and rotary nozzle with wiper.

In FIG. 1, container 1 with skids 3 is designed to be pushed or pulled through a pipe, such as an underground gas, water or sewer pipe. The container 3 has the usual internal piston (not shown) which maintains pressure on the liquid or plastic material in the container such as grout or epoxy compositions for sealing, the piston being urged by compressed air or other fluid. An example of a typical such container is disclosed in U.S. Pat. No. 2,894,539 and the container structure per se forms no part of the present invention. A conduit shaft 5 extends from the container interior to a nozzle 6 which is in direct drive with the shaft 8 of air motor 7 mounted on conduit 5. The direct drive shown is a friction rotor 11 which bears on a rim surface 14 of the nozzle. The motor can be either electrical or air but the latter is preferred for operation in gas lines or other pipes where sparks should be eliminated.

The nozzle 6 has swivel eye bolt receiver 15 at its forward end to which a sealed, closed circuit TV can be coupled to view the nozzle and the interior of the pipe as the entire assembly is moved through a pipe to inspect and repair same for leaks, faults, joints, etc.

The nozzle 6, shown in FIGS. 1 and 2 includes an outer, rotatable casing which houses the end or head 17 of conduit 5. During operation, the head 17 and conduit 5 remain stationary while the nozzle 6 is rotated about bearing 20. The head 17 has at least one passageway 18 extending laterally of the longitudinal axis of conduit 5. Nozzle 6 has at least one duct 21 through its wall which can be fitted to a tube 22.

In FIG. 1, the tube 22 has a cylinder extension 25 with spring 27, the cylinder 25 being slideable within sleeve 29 to compress the spring 27 and bias the sleeve 29 to bear on wiper portion 31. Wiper portion 31 has an outlet 33 in communication with duct 21, passage 18, conduit 5 and, ultimately the interior of container 1. The wiper portion is dimensioned to contact the interior surface of the pipe being treated so that each revolution of nozzle 6 also turns the wiper portion 31 in a circular path, the circumference of which closely corresponds to the inside diameter of the pipe. At the same time, sealing grout or other fluid material flows under pressure from container 1 to pass through outlet 33 and thus is wiped on pipe's interior or in the cracks and faults of the pipes. A doctor blade or other wiper portions of different configuration and/or with difference outlets can be substituted for that shown in FIG. 1.

In FIGS. 3A, 3B, and 3C, the shaft conduit 5 has two passages 18a which extend at right angles to the longitudinal axis of the conduit and the exit mouth of each passage 18a is curved so that exiting fluid will impart optimum tangential force on the inside diameter of the nozzle and in FIG. 3B, TF is the tangential force applied upon release through duct 21 and cylinder 25. In FIG. 3C, the position of nozzle 6 is shown relative to conduit 5 and the lines of force of fluid through the space 16 between the head 17 and nozzle 6 are also indicated.

FIG. 4 shows a modified nozzle, 6a with a plurality of tubes 22a and ducts 21a both of which are arranged generally perpendicular relative to the conduit 5. The head 17 of conduit 5 is the same as that shown in FIG. 3A and is preferably round and enlarged with respect to the remainder of the conduit shaft 5.

In FIGS. 6 and 7, a spinner-slinger nozzle 6b is shown with a plurality of ducts 21b which pass through the nozzle's wall tangential to the head 17. In this modification, there are no exterior tubes in the nozzle. The passages 18a of the head 17 are curved the same as those of FIG. 5 and the nozzle 6b is designed to rapidly spin during operation.

In FIGS. 8 and 9, a high speed rotary slinger nozzle 6c is shown housing an enlarged head 17c having at least one passage 18c. The nozzle 6c comprises a pair of opposing plate members 35 and 36, held together by bolts 38 and rotatably mounted on bearings 39 with a pulley 40 on member 35. The head 17c can have as many straight passages 18c as desired while the duct 21c is continuous around the periphery of nozzle 6c except at the sites of bolts 38. The space 16c between passage 18c and duct 21c is relatively large and there is no turbine effect achieved with the structure shown. However, the nozzle is designed to be rotated at a high speed via pulley 40 to "sling" grout material, for instance, at high centrifugal force.

FIGS. 10 and 11 show a probe casing 80 in closed and extended positions respectively. FIG. 10 shows a channel 81 to be placed in communication with a duct 21 of the nozzle 6 when the lower end of casing 80 is connected to the nozzle. The channel 81 leads into a well 83 in the assembly and an extensible element 82 with stop 84 is slideably fitted in the well 83. When compressed air is forced through conduit 5, passage 18, duct 21 and channel 81, the stop 84 is urged outwardly to extend the probe as seen in FIG. 11. When the FIG. 4 nozzle is used, the additional ducts 21a in the nozzle 6a can be used to direct rotary air blasts to clean the interior of the pipe as the probe is rotated to sense holes or plugs. The probe 82 is indexed with circles so that the extended length of the probe can be viewed in a TV camera.

In the above described nozzles, a conventional washing solution or grout sealing composition can be used.

More recently, however, epoxy compositions have been used with success, particularly in the smaller diameter gas pipe lines, i.e., those pipe lines having diameters less than 12 inches. In such applications the nozzle of FIGS. 6 and 7 finds particular use and recommended formulations based on "Epon" Resin 828 made by Shell can be used to coat the interior of a 6" gas pipe, say ⅛-inch thick to seal all joints and/or leaks whereby the line can sustain the relatively high gas pressures.

What is claimed is:

1. A movable device for supplying a fluid to the interior surfaces of a pipe comprising a container for a supply of treating fluid, a supply conduit leading from the interior of said container and a plurality of interchangeable rotary nozzles connectable to said conduit to be placed in communication with said container, said nozzles each being rotatable about an axis extending generally in the direction of travel of said device and comprising a hollow chamber for housing a head at one end of said conduit, said head being fixed to said conduit with at least one fluid passage in said head and a communicating duct in said chamber extending laterally from said conduit, means associated with each nozzle for rotating same about said conduit, said fluid being pressured in said container and urged through said conduit and passage to exit under pressure in a generally circular path relative to said axis.

2. The device of claim 1, wherein said nozzles include hollow tube means connected to each duct, said tube means extending laterally from said conduit and said tube means terminating in a wiper portion with an exit.

3. The device of claim 2, wherein said wiper portion is biased laterally away from said conduit.

4. The device of claim 1 wherein said head has a passage that extends completely through same transverse to the longitudinal axis of said conduit and said nozzle has a plurality of ducts in its walls.

5. The device of claim 1 wherein said conduit is a hollow shaft and said nozzle is comprised of a pair of opposing spaced apart plates with said head mounted on said shaft between said plates.

6. The device of claim 1 wherein said head has at least one passage that is formed in a curved path, when viewed in section, whereby fluid under pressure leaves said passage and imparts a tangential force to said nozzle.

7. The device of claim 6 wherein there are a plurality of ducts in the walls of said nozzle.

8. The device of claim 6 wherein said head is round in configuration and said duct extends within said nozzle to orient its opening generally tangentially relative to said head.

9. The device of claim 1 wherein a motor is mounted on said device adjacent said nozzle, said motor having a shaft geared to said nozzle to rotate same.

10. The device of claim 1 wherein a probe is connected to said nozzle, said probe extending laterally relative to said conduit and comprising an extensible element with a stop housed within the well of a hollow member, said well being in communication with said duct and conduit to permit the entrance of fluid under pressure whereby said element is extended outwardly to the limit of said stop.

* * * * *